July 20, 1926.
A. P. BRUSH
1,593,159
THERMOMETER
Filed Jan. 15, 1926
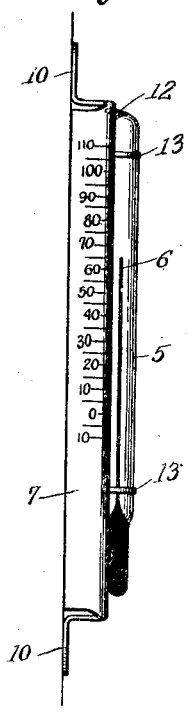
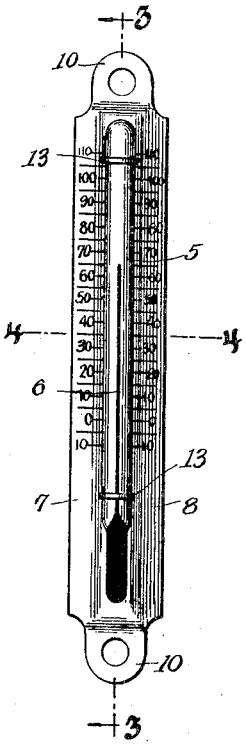
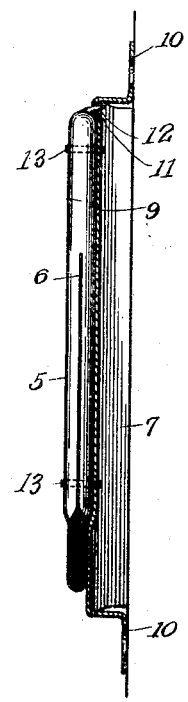
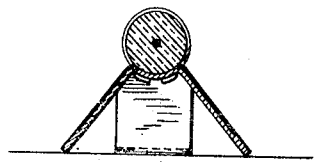
INVENTOR
Abbott P. Brush
BY
Philip S. McLean
ATTORNEY Patented July 20, 1926.

1,593,159

UNITED STATES PATENT OFFICE.

ABBOTT P. BRUSH, OF GREENWICH, CONNECTICUT.

THERMOMETER.

Application filed January 15, 1926. Serial No. 81,429.

The objects of this invention are to provide a thermometer so constructed and arranged that it may be read from different sides as well as from immediately in front of the same and particularly to provide such an instrument in a simple, practical, attractive and inexpensive form.

The foregoing and other desirable objects are attained in the form of the invention illustrated in the accompanying drawing, in which:

Figure 1 is a side elevation of the thermometer as applied to a wall.

Figure 2 is a front view of the same.

Figure 3 is a vertical sectional view as on line 3—3 of Figure 2.

Figure 4 is an enlarged cross sectional view as on the line 4—4 of Figure 3.

The thermometer tube 5 and the expansible indicating column 6 may be of any usual or special form or materials.

This thermometric column is supported substantially at the apex of the angle formed by two coextensive scales 7, 8.

In the illustration the two scales are formed from a single piece of sheet metal bent along the center to form a sharply obtruding angle and at the center of the ridge between the scales, a longitudinal depression 9 is formed as a seat for the thermometer tube and serving to set the column backward closer to the graduations of the scales, as indicated in Figure 1.

In this sheet metal structure perforated lugs 10 are bent back at the ends to provide for the mounting of the thermometer on a wall or the like and to close or partially close the openings at top and bottom between the divergent scales. The tube is shown properly positioned with respect to the scales by its engagement in the seat or depression provided therefor and by the entry of the sealing tip 11 at the upper end of the same through a perforation 12 provided at the upper end of the positioning seat. Encircling bands 13 are shown for securing the thus positioned tube.

The sharp angles of the scales cause them to stand out from the wall or other support to such an extent that they can each be easily read from the side of the instrument and the mounting of the tube in an exposed and wholly unobstructed position at the apex of the angle makes it possible to read the thermometer from the front on either the left hand or the right hand scale, Figure 2. Thus when mounted on a wall, the thermometer may be read from any angle throughout an arc of over 180 degrees.

This ability to read the thermometer throughout so great an arc makes the instrument particularly useful in closed motor cars where the practice is to mount the thermometer on the side wall of the car at some point between the front and rear seats. In this position the thermometer is easily read by the occupants of both front and rear seats. Aside from its utility, this thermometer, because of its neat and attractive appearance, adds a certain ornamental value.

What is claimed is:

1. A wall thermometer comprising two coextensive and similar thermometer scales arranged at a sharply obtruding angle, a thermometric column exposed at the apex made by the angle of said scales between but in front of the angularly adjacent edges of the scales and means enabling the mounting of said thermometer with the divergently related separated rear edges of the scales backed against a wall or other support, both divergent scales and the column between them being wholly uncovered and exposed at all angles about the front of the instrument whereby the instrument may be read from either side or from immediately in front of the same and at all angles throughout a range of over 180 degrees.

2. A wall thermometer comprising two coextensive thermometer scales arranged at a sharply obtruding angle, a thermometric column exposed at the apex made by the angle of said scales between but in front of the angularly adjacent edges of the scales and means enabling the mounting of said thermometer with the divergently related separated rear edges of the scales backed against a wall or other support whereby the instrument may be read from either side or from in front of the same at various angles throughout a range of over 180 degrees, the scales being provided along the sides of a single piece of sheet material bent longitudinally along the center and having a depression in the bend forming a seat for the thermometer tube and the mounting means comprising rearwardly bent integrally perforated lugs at the upper and lower ends of the sheet material.

In witness whereof, I have hereunto set my hand this 14th day of January, 1926.

ABBOTT P. BRUSH.